Figure 7:
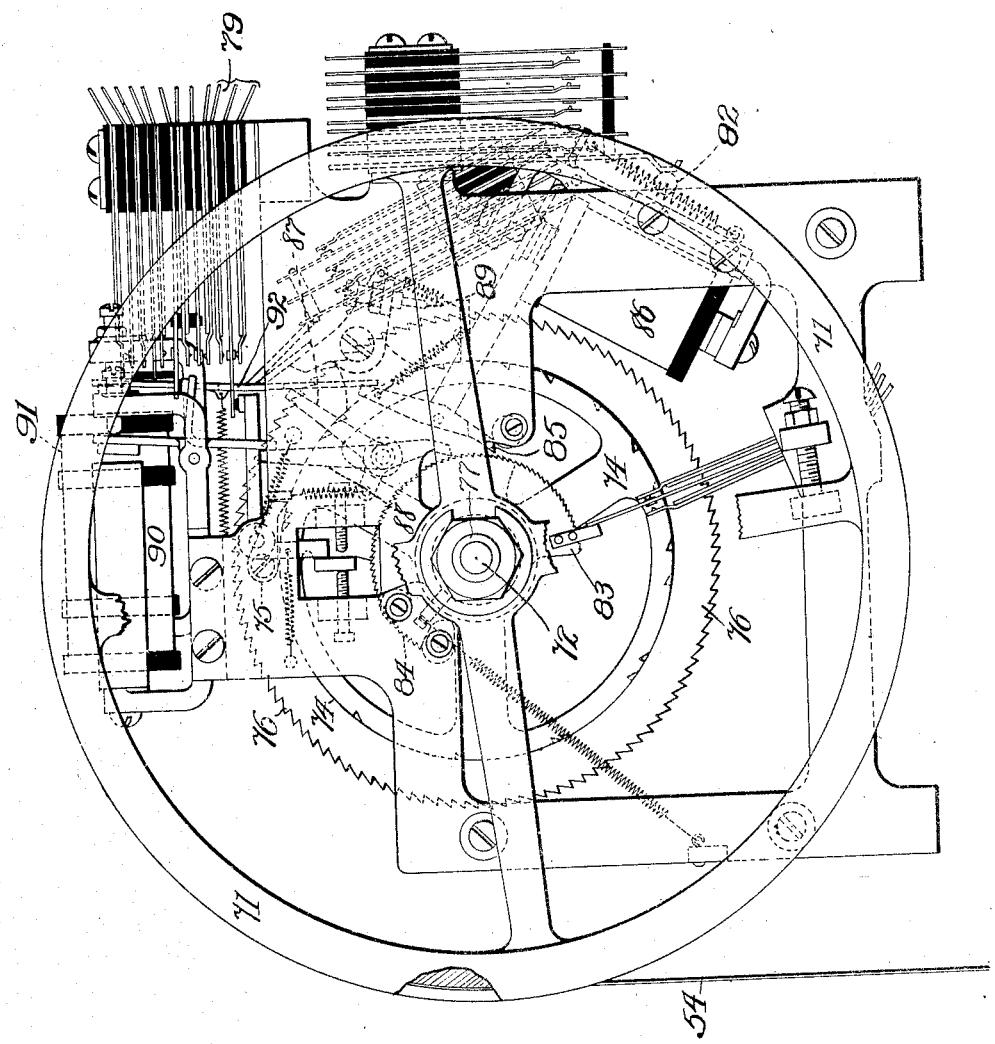

J. L. McQUARRIE & E. B. CRAFT.
SELECTOR.
APPLICATION FILED JAN. 18, 1908.
949,836.
Patented Feb. 22, 1910.
8 SHEETS—SHEET 1.
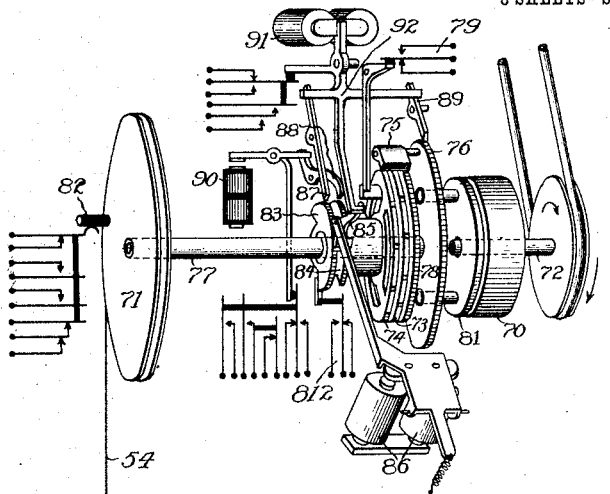
Fig. 1.
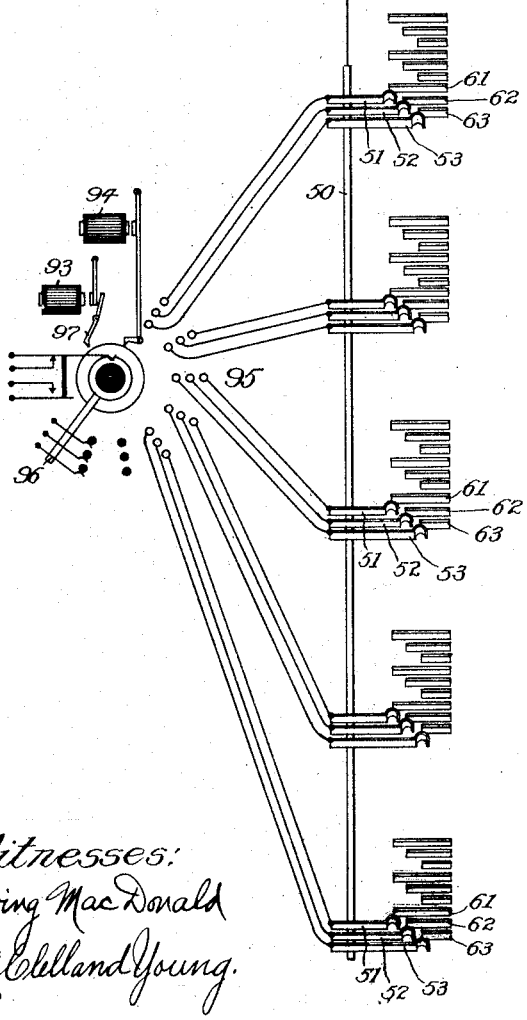
Witnesses:
Irving MacDonald
McClelland Young.
Inventors:
James L. McQuarrie,
Edward B. Craft,
By Barton, Tanner & Folk
Attys

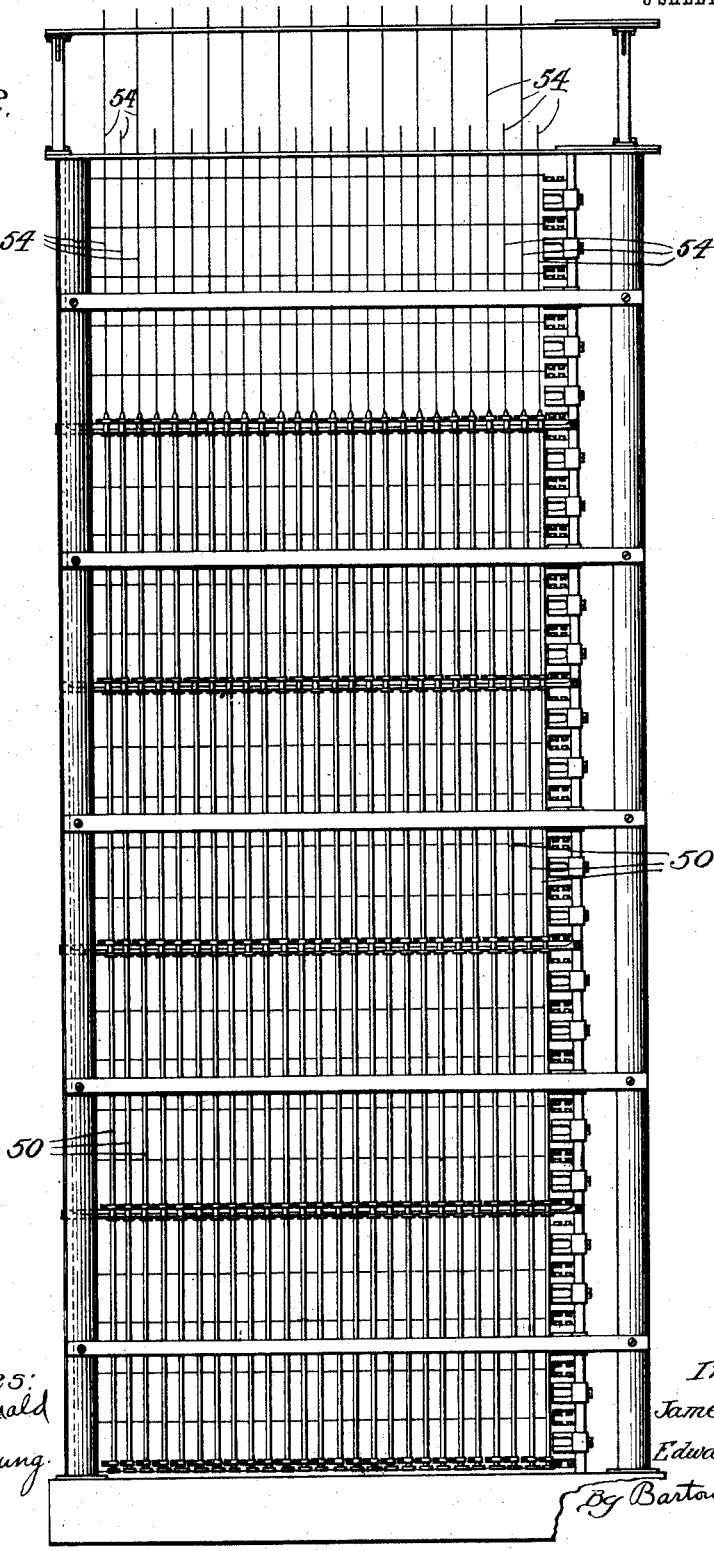

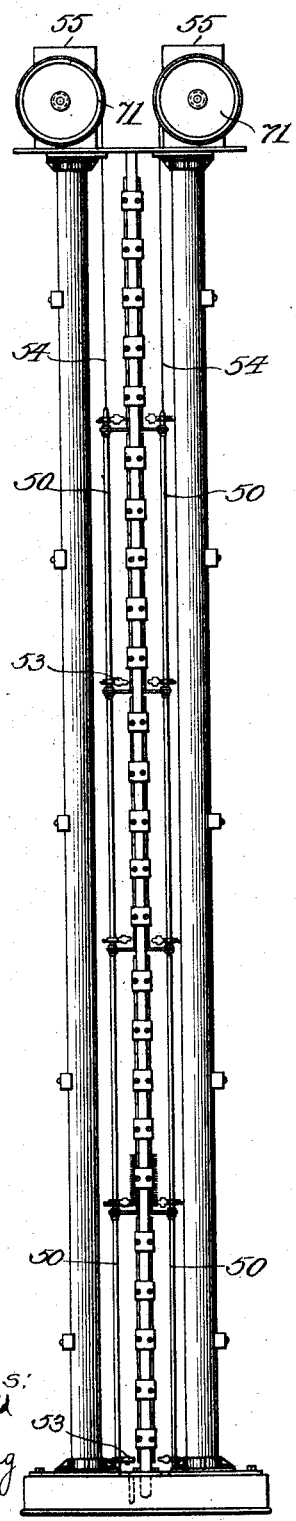
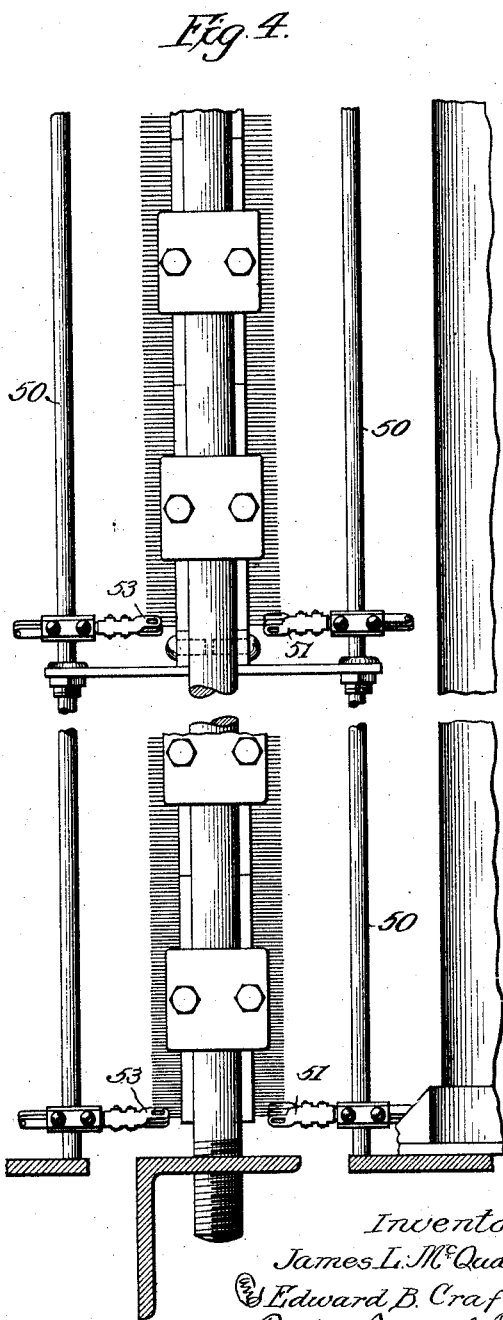

J. L. McQUARRIE & E. B. CRAFT.
SELECTOR.
APPLICATION FILED JAN. 18, 1908.
949,836.
Patented Feb. 22, 1910.
8 SHEETS—SHEET 4.
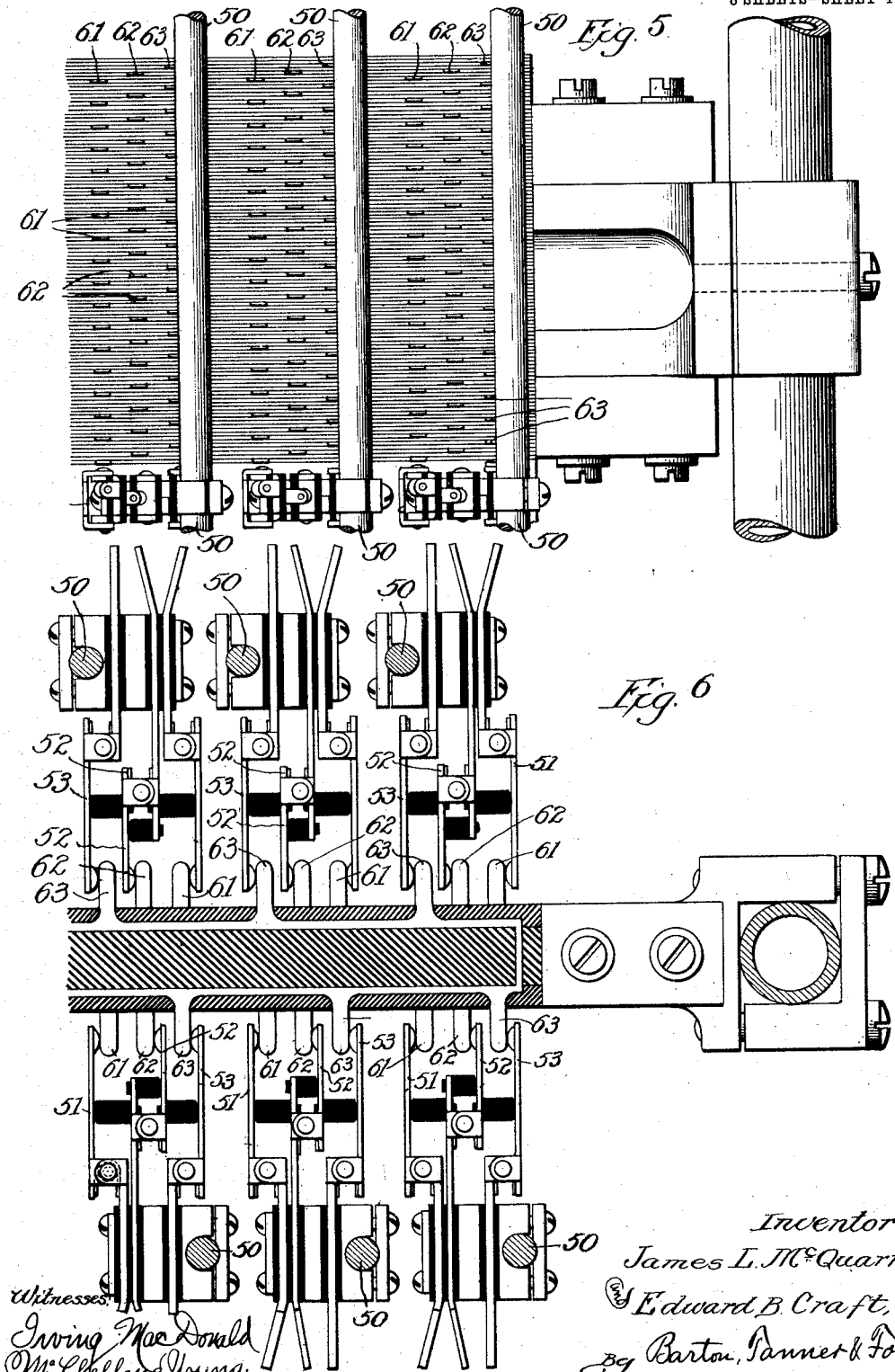

J. L. McQUARRIE & E. B. CRAFT.
SELECTOR.
APPLICATION FILED JAN. 18, 1908.

949,836.

Patented Feb. 22, 1910.
8 SHEETS—SHEET 5.

Witnesses.
Irving MacDonald
McClelland Young

Inventors:
James L. McQuarrie
Edward B. Craft
By Barton, Panner & Falk,
Attys.

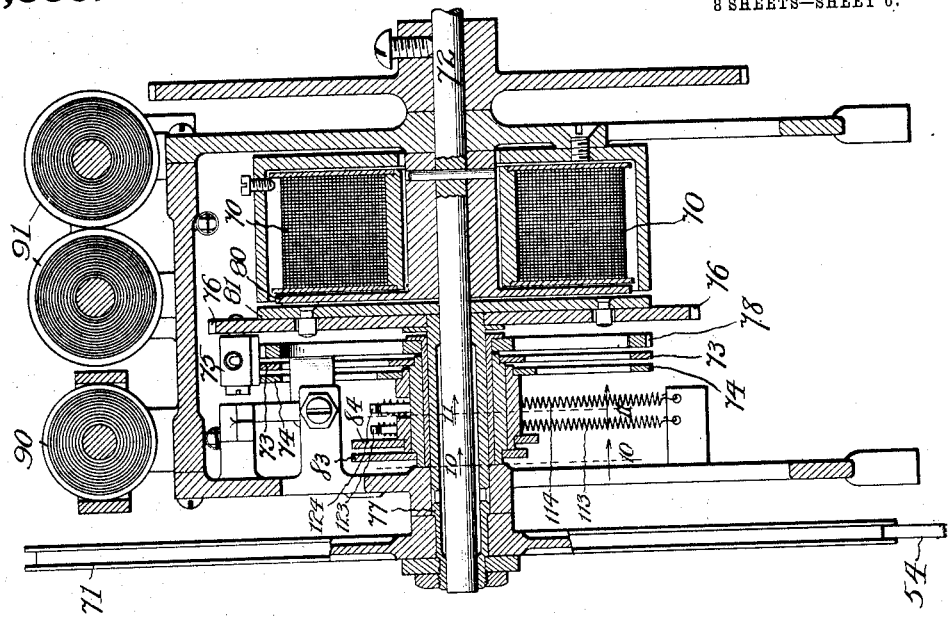

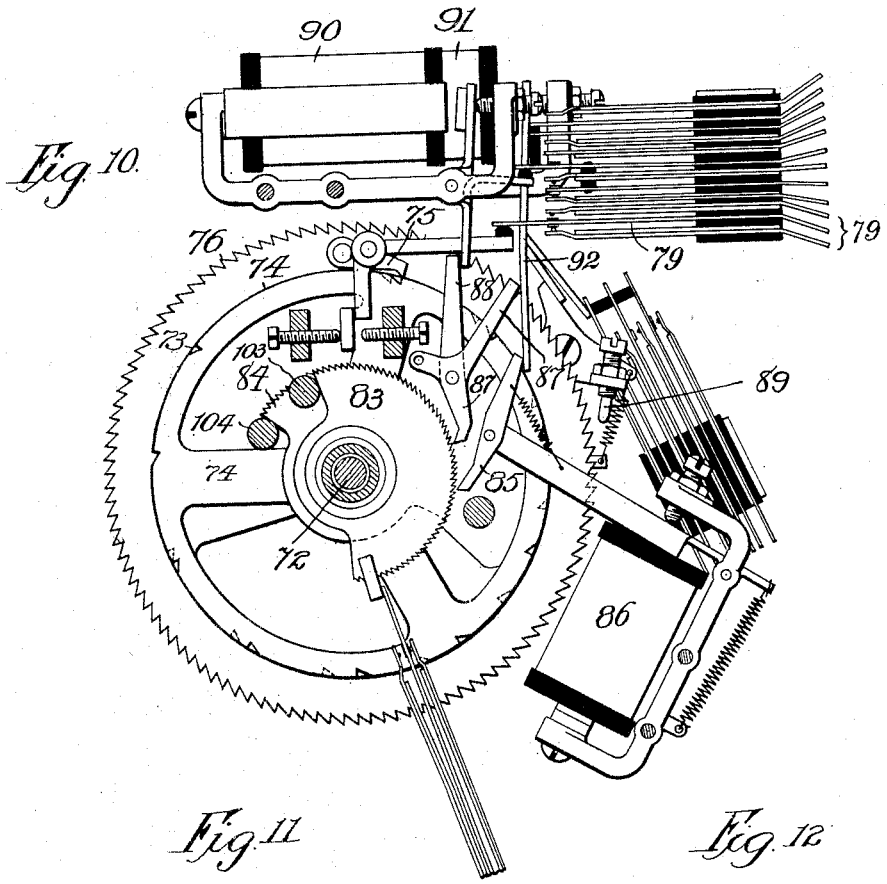
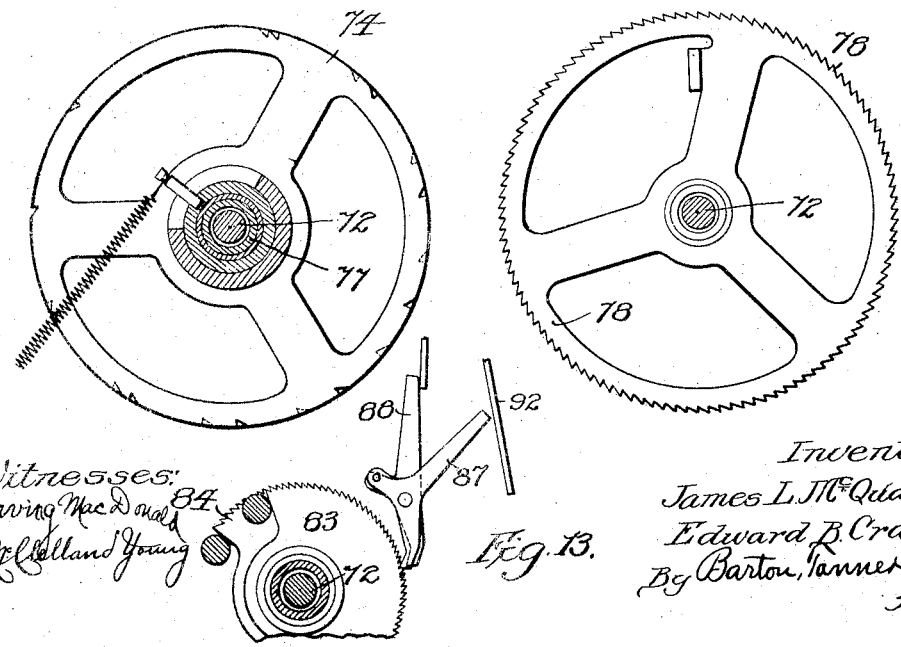

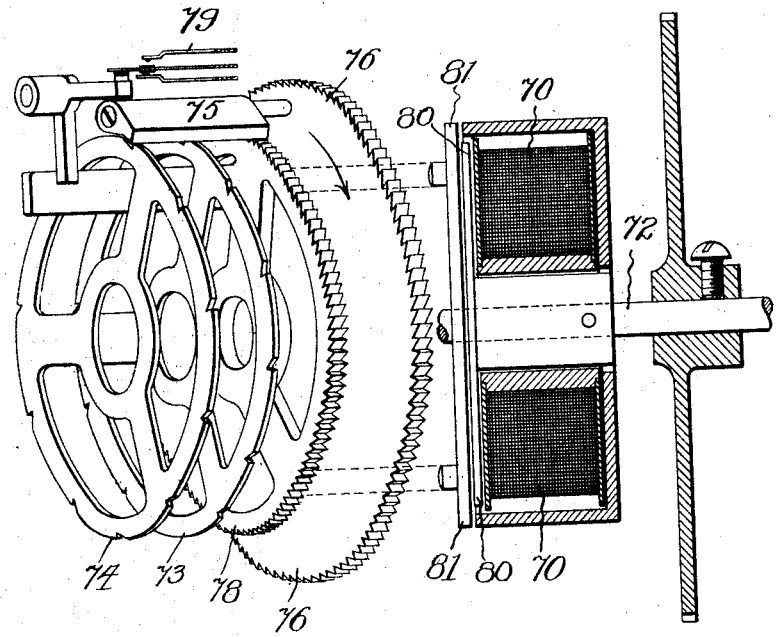
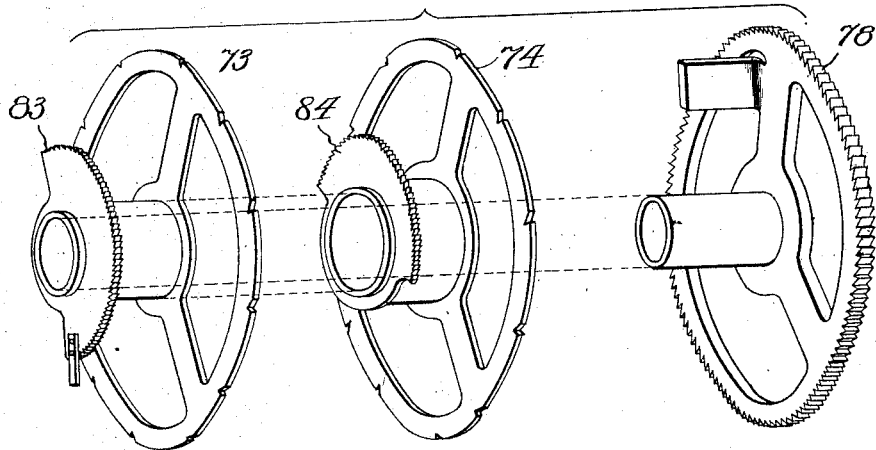

UNITED STATES PATENT OFFICE.

JAMES L. McQUARRIE AND EDWARD B. CRAFT, OF NEW YORK, N. Y., ASSIGNORS TO WESTERN ELECTRIC COMPANY, OF CHICAGO, ILLINOIS, A CORPORATION OF ILLINOIS.

SELECTOR.

949,836.  Specification of Letters Patent.  Patented Feb. 22, 1910.

Application filed January 18, 1908. Serial No. 411,426.

*To all whom it may concern:*

Be it known that we, JAMES L. McQUARRIE and EDWARD B. CRAFT, citizens of the United States, residing at New York, in the county of New York and State of New York, have invented a certain new and useful Improvement in Selectors, of which the following is a full, clear, concise, and exact description.

This invention relates to automatic selector switches of a type particularly adapted for use in automatic and semi-mechanical telephone exchange systems, and its object is to provide an improved selector of compact and comparatively simple construction which, while having capacity to make connection to any one of a large number of lines, will be efficient, rapid and certain in operation, not easily put out of order, and responsive to comparatively feeble selecting impulses.

One feature of the invention lies in a construction wherein the multiple line terminals for a number of individual selectors are assembled in a large flat-faced bank or panel over which contact brushes carried by vertical slide-rods are adapted to travel. These brush-carrying slide-rods, which form the movable switch-members of the individual selectors, may be mounted closely together along the horizontal width of the board, to traverse corresponding rows of terminals, and each rod is connected by a flexible member such as a cord or metal ribbon to an individual self-contained selectively-operated lift mechanism mounted at the top of the panel.

Another feature of the invention relates to a construction of the individual selector mechanisms such that but little mechanical work will be required of the magnets which respond to the selecting impulses. These magnets serve merely to adjust, in suitable steps, a comparatively light and simple controlling or stop-setting apparatus, and auxiliary motive power is applied as by a magnetic clutch to carry the movable switch member directly to the ultimate point predetermined by the previous completed selecting operation of the stop-setting apparatus, the clutch being thrown off through the agency of said stop-setting apparatus at the point predetermined by its selective adjustment.

The invention will be described in detail by reference to the accompanying drawings, in which—

Figure 1 is a diagram illustrating the principal operating parts of a selector switch, this diagram not being intended to show the actual proportions of the parts, but only to indicate schematically in a single view the various elements of the complete selector, and their operative relations to one another; Fig. 2 is a front view of the terminal board; Fig. 3 is an end or edge view thereof; Fig. 4 is an edge view of a portion of the board on a larger scale; Fig. 5 is a front view of a portion of the board; Fig. 6 is a sectional plan view of such portion; Figs. 7 to 15 inclusive illustrate the mechanical construction of one form of selector mechanism which may be employed, the particular one shown being a "final selector" or "connector;" Fig. 7 is a side view of the selector mechanism; Fig. 8 is a front view thereof; Fig. 9 is a sectional elevation thereof on the lines of the operating shaft; Fig. 10 is a detail sectional view of the selector mechanism, showing the vernier stop-setting mechanism; Fig. 11 is a detail cross-sectional view on line 11—11 of Fig. 9 showing the mounting of one of the vernier wheels; Fig. 12 is a detail view of the units wheel or stop-wheel; Fig. 13 is a detail view of the ratchets for the vernier wheels; Fig. 14 is a detail perspective view of the vernier stop-setting mechanism, the clutch being shown in section; and Fig. 15 shows the vernier wheels and the units wheel or stop-wheel, in perspective.

Like parts are designated by similar characters of reference throughout the drawings.

As shown in Figs. 2, 3, 4, 5 and 6, the movable contact brushes of the selector are mounted in sets upon vertically-movable slide rods or carriers 50, so as to travel over and make engagement with stationary contact terminals. The brush carrier rods are arranged to be raised by an operating mechanism hereinafter described. The switchboard is built up in flat-faced panels with rows of terminals upon both the front and rear faces thereof, and the brush-carrier rods 50 of several selectors are mounted before each face of the panel terminal-board. The board shown is of a type adapted to accommodate the multiple terminals of five hundred lines, and is shown as common to fifty-two selectors, there being twenty-six brush-carrier rods on each side. Each set of stationary terminals will generally comprise three individual contact lugs or points 61, 62, 63 (Fig. 5) which are adapted to be engaged by the contact brushes 51, 52, 53, respectively, of the traveling contact mechanism, as shown in Fig. 6. In order that each of the brush-carriers of a number of selectors may be able to reach with its brushes any one of the same group of five hundred terminals, these terminals are multiplied horizontally across the face of the board. The multiple terminals can be conveniently and cheaply made from punchings or strips, as shown in Fig. 6, each strip having a series of projecting lugs thereon associated respectively with the several brush-carriers. These strips may be set in horizontal slots in the face of the terminal board, the interstices being filled with insulating material. The contact brushes which travel over these terminals may be of any desired type. The ones shown have spring-pressed arms which are adapted to pass over and make contact with the side edges of the projecting contact terminal lugs, as shown in Fig. 6. In the particular mechanism shown, the brush-carrier rods are hung by cords or preferably steel ribbons 54 from the operating or "elevator" mechanism, which may be mounted at the top of the panel, as indicated diagrammatically in Fig. 3. The suspending cords or ribbons may pass around the sheaves or drums 71 of the elevator mechanism, so that by a rotary movement of the sheave of any selector, the brush carrier rod of such selector will be lifted thereby to bring its brushes into contact with any desired set of terminals in their path. To lessen the distance through which any brush carrier is required to travel, a number of sets of brushes may be mounted upon each brush carrier, each set of brushes being intended to move over only a corresponding fraction of the whole row of terminals. In the selectors shown, the terminal board is divided into five zones of one hundred sets of terminals each, and each brush carrier rod is provided with five sets of brushes, one set for each zone. In order, therefore, to make connection with any particular one of its five hundred sets of terminals an auxiliary or brush-choosing selector 95 shown diagrammatically in Fig. 1 is arranged to first choose the set of brushes which travels over the particular zone containing the desired set of terminals, and thereupon the brush carrier rod is moved only a short distance necessary for the selected brush to reach the terminal in question. These selector switches having the flat-faced terminal board common to a number of them, as above described, are advantageous in that they can be mounted close together in a comparatively small space, while still having all their parts easily accessible; and the wiring of the terminals is greatly simplified by their construction in sheet metal strips, both front and rear faces of the board being equally available for reception of the traveling brush carriers. The line terminals common to a large number of selector switches are assembled very compactly in a solid unitary structure, while the brush carriers and operating mechanisms therefor are individually self-contained structures which are accessible and removable quite independently.

The selectors preferably employed are of a novel type in which, instead of the traveling brush being moved step by step to the desired point by the direct action of the magnets which respond to the selecting impulses, such magnet or magnets merely act to set a stop which shall determine the travel of the brush, and power is then applied to take the brush directly to such predetermined point. In the selector shown, two or more parts, the positions of which are adjusted by the selecting impulses, act in combination to set a stop determined by their relative positions. Each part has on it a scale with divisions of different length from those of the other part, like a vernier; and the setting of the stop is determined by the point at which the scales coincide. A very slight movement of one scale will thus be sufficient to cause the point of coincidence of the scales to occur at a relatively great distance from the starting point. The stopping point of the traveling switch member is thus determined by the combination set up, so to speak, by the coöperating scales, as a result of the selecting impulses, neither of said scales requiring very extended movement to secure wide variations in the extent of travel of said switch member.

The brush carrier 50 (Fig. 6) of the selector is arranged to be moved by mechanical power applied under the control of an electromagnet 70 (Fig. 9) to a point predetermined by the electromagnetic stop-setting mechanism actuated in response to the selecting impulses. As shown, the magnet 70 controls a clutch by which a constantly-driven shaft 72 may be coupled to drive the carrier sheave 71 from which the brush carrier rod is suspended by the cord or metal ribbon 54. The clutch members, consisting of friction plates 80, 81, one of which is mounted upon the driving shaft 72, and the other upon a tubular shaft 77 carrying the sheave 71, are adapted to be drawn into engagement by the clutch magnet 70 acting on plate 81, which is of iron. When said clutch magnet is excited, therefore, the carrier sheave will be rotated and the contact brushes advanced to the predetermined stopping point by power applied through said clutch members.

The stop-setting mechanism, as shown in

Fig. 14 comprises two vernier disks 73, 74, mounted side by side and having peripheral notches adapted to be engaged by a pawl 75 which is carried forward around the edges of said disks as the brush carrier moves from its zero position. This pawl 75 is carried by a disk 76 which is mounted upon the tubular shaft 77 of the carrier pulley 71 so as to rotate therewith. Side by side with the disks 73, 74 is a third disk 78 having notches around its edge so spaced that the travel of the pawl 75 from one of these notches to the next will correspond to a movement of the selector brushes from one set of stationary terminals to the next. The notches on disks 73 and 74 are located at differently-spaced intervals, as will hereinafter be described. The pawl 75 is normally held out of engagement with the notches of disk 78 by the disks 73, 74 upon which it rides; but when it reaches a point at which the notches of said disks 73, 74 coincides, it falls in, engages the corresponding notch of disk 78 and moves said disk sufficiently to operate a set of switch springs 79 by which the clutch may be thrown off and the mechanism stopped. The disk 78 is not required to rotate more than the slight distance sufficient to operate the clutch-release springs 79. The disk 76 carrying the pawl 75 is adapted to be held by a pawl 89 (Fig. 10) engaging ratchet teeth on its edge, so that when the units disk 78 has been moved by pawl 75 sufficiently to actuate the contact springs 79, said disk 78 is held in such advanced position by the pawl 75 whether the clutch is on or not. But, if under such circumstances the vernier disk 73 is given another step, the pawl 75 will thereby be raised out of engagement with the teeth of disks 78 and 74, permitting disk 78 to return to normal position and restore the springs 79.

The point at which the notches of disks 73 and 74 will coincide, and consequently the stopping point of the brush carrier, is determined by the relative positions of said disks, which may be adjusted by means of electromagnetic step-by-step mechanism responsive to the selecting impulses. In the selector shown, the notches of disk 74 are spaced apart a distance corresponding to ten notches on the disk 78, which form, so to speak, a units scale. The notches of disk 73, on the other hand, are spaced apart a distance corresponding to only nine notches or divisions of said units disk 78. In the mechanism shown, the disks 73 and 74 normally rest so that a single independent step of disk 73 and a further step of both disks 73 and 74 will bring the notches of all three disks into coincidence at zero or the normal position of the traveling pawl 75. In the operation of the system in which this selector is particularly adapted to be used, the vernier disk 73 is always intended to take at least one independent step, which would set the stop one notch back of zero. If then the disk 73 is advanced an additional step equal to one space on the units scale, the first point at which the scales 73 and 74 coincide will be opposite the ninth notch of the units scale. Similarly an advance of disk 73 through two steps from zero will throw the point of coincidence to the nineteenth notch of the units scale, and so on, each unit of advance of the vernier disk 73 throwing the point of coincidence a distance of ten units ahead. If it is desired to set up a coincidence at an intermediate point between any given tens divisions and the next, that is accomplished by first advancing the vernier disk 73 a number of units steps sufficient to reach the required bank of tens, and then advancing both disks 73 and 74 together unit by unit, until the desired intermediate point is reached. At least one step of both disks together is always given. Thus to set the coinciding point at the thirty-fifth notch from zero on the units disk or scale, the vernier disk 73 would first be advanced four steps (that is, three steps from zero) throwing the point of coincidence to the twenty-ninth notch from zero on the units disk, and then both disks 73 and 74 would be stepped ahead together a distance of six units, and the notches of the three disks would then coincide at the thirty-fifth notch from zero on the units scale, and no coincidence would occur in advance of that point. By this mechanism a stopping point may thus be established at a point far distant from the zero position, by relatively slight movements of the disks 73 and 74.

Each of the disks 73 and 74 is provided with a segmental ratchet 83, 84, respectively, (see Fig. 15) with which the pawl 85 of a stepping magnet 86 is adapted to engage. The ratchet 83 (Fig. 9) is mounted upon the same tubular shaft with the vernier disk 73, and similarly the ratchet 84 is mounted upon a concentric tubular shaft which carries the vernier disk 74. The ratchets 83 and 84 are yieldingly held against backward limiting stops 103 and 104, respectively, (Fig. 10) by means of springs 113, 114, which act upon studs 123, 124 projecting from the respective tubular shafts, which carry the vernier disks, as shown in Fig. 9. Figs. 10 and 11 illustrate the normal relative positions of the vernier disks 73 and 74, the positions of the notches in disk 73 being indicated by dotted lines behind disk 74.

Holding pawls 87, 88, shown most clearly in Figs. 10 and 13, may be thrown into engagement with the ratchets 83, 84, respectively, to hold the latter in the positions to which they may be advanced, these holding pawls 87 and 88 being controlled respectively by a shift magnet 90 and the holding magnet 91. These holding pawls 87 and 88 are thus independently controllable, so that although the pawl 85 of the stepping magnet acts upon both ratchets 83 and 84, the actual stepping ahead of these ratchets will depend upon whether their respective holding pawls are thrown into gear. If the holding pawl 87 is alone thrown into gear with its ratchet 83, the step magnet will only advance the vernier disk 73; the other disk 74 being practically unaffected because it is retracted to its zero position at the end of each stroke of the step magnet. But if both holding pawls 87 and 88 are thrown into engagement with the ratchets 83 and 84, the stepping magnet will then advance both of the vernier disks 73 and 74 together. By virtue of this construction, it is unnecessary to have separate stepping magnets for long and short steps, as the single stepping magnet 86 can act first as a long step magnet, to advance the vernier disk 73, giving the tens division, and then after the operation of the units wheel holding magnet 90, said step magnet advances both disks 73 and 74 together to give the units divisions.

The holding magnet 91 has an armature which is adapted to bring into service the holding pawls for all the ratchets of the operating mechanism, with the exception of the holding pawl 88, which is individually controlled by the " units-wheel holding magnet " 90. As shown most clearly in Fig. 7 and in the diagram, Fig. 1, the armature of the holding magnet 91 may also be arranged to operate a set of switch springs, and the units-wheel holding magnet 90 which controls the holding pawl 88 may also operate a set of switch springs. A third set of switch springs may be controlled by the sheave or carrier pulley 71, being held in one condition by a stud 82 on said pulley when the latter is in its zero position, and allowed to shift when the pulley removes said stud in leaving its normal position. Another set of springs 812 may be controlled by the ratchet disk 83, said springs being held in one position when the ratchet disk is at zero, and allowed to shift when said ratchet disk leaves its zero position. These switch springs may be used as required to control various circuits of the system in which the selector is to be used.

The auxiliary selector for choosing a given set of brushes on the slide rod of the main selector may be of an ordinary type such as shown. The five sets of main brushes 51, 52, 53 are connected respectively to five sets of stationary terminals upon the auxiliary selector. A movable brush arm 96 is provided with three brushes or wipers arranged to travel over and make contact with these stationary terminals. This arm is arranged to be actuated by a step-by-step ratchet mechanism operated by a step magnet 94; a holding pawl 97, for retaining the ratchet wheel in its advanced position, being controlled by a holding magnet 93.

After a particular set of brushes on the main selector rod has been chosen by the auxiliary selector, thus selecting a hundreds zone, the operation of the mechanism will in general be as follows: The holding magnet 91 will first be energized to attract its armature, allowing the pawl 85 of the stepping magnet to engage the ratchets 83 and 84, and also allowing the holding pawl 87 of ratchet 83 to engage said ratchet, and the holding pawl 89 to engage ratchet teeth on the disk 76, which rotates with the carrier pulley or sheave 71. The step magnet may now, through the agency of ratchet 83, advance the vernier disk 73 the required number of steps to bring the point of coincidence of the notches on disks 73 and 74 in the required bank of tens or long divisions of the scale. The shift magnet 90 will then be operated to bring the holding pawl 88 into engagement with ratchet 84, whereupon further actuation of the stepping magnet will advance both disks 73 and 74 together the required number of steps to reach the intermediate point or " units place " desired on the scale. The stop being thus set, the clutch magnet 70 is then excited, whereby the constantly-rotating shaft 72 is coupled to drive the carrier pulley 71 and raise the brush carrier rod, at the same time advancing the pawl 75, carried by disk 76, around the periphery of the disks 73, 74 and 78. When this pawl 75 reaches the predetermined point at which the notches in the three disks coincide, it drops in and moves disk 78 sufficiently to operate the clutch release springs 79 which may be arranged to open the circuit of the magnetic clutch. The traveling brush of the selector has thus been moved to the required point and stopped. If a further movement of the brush is desired, as in hunting for an idle terminal, the stepping magnet may be given a stroke to advance the disk 73, and throw the notches now under the pawl 75 out of coincidence, whereupon the clutch may be thrown on again by the recovery of springs 79, and rotate the carrier pulley to continue the travel of the selector brush until it reaches an idle terminal, whereupon the clutch magnet will be deënergized, leaving the traveling brush of the selector in contact with the idle terminal, the mechanism being held against return to zero by the holding pawls controlled by the holding magnet.

Certain details of construction of the selector mechanism which has been chosen to illustrate this invention have been worked out by Edward B. Craft and Amos F. Dixon, and are specifically claimed in their application, Serial No. 410,320, filed January 11, 1908. A modified form of operating mechanism for the selector switch of our invention is also disclosed and claimed in a sole application of Amos F. Dixon, Serial No. 411,551 filed January 20, 1908.

It will be evident that the invention herein described may be applied to intermediate selectors as well as to final selectors or connectors; that the forms of its various elements may be varied within wide limits; and that equivalent means or elements may be substituted for the particular elements herein described, without departing from the generic features of the invention.

We claim:—

1. A selector comprising a movable switch member, stop setting mechanism, an electromagnetic step-by-step device, responsive to selecting impulses, for adjusting said stop-setting mechanism, a source of motive power, means for applying the same to advance said switch member, and means controlled by said stop-setting mechanism according to its completed selective adjustment, for cutting off the application of motive power from said switch member.

2. In a selector, the combination with a movable switch member, of a continuously acting source of power for advancing the same, a clutch controlling the application of power to drive said switch member, a controller mechanism having a relatively-movable part arranged to travel proportionately to the advance of the switch member, means for selectively adjusting said controller mechanism, and means controlled by said relatively-movable part in reaching a point in its travel predetermined by the adjustment of said controller mechanism, for throwing off the clutch.

3. A selector switch comprising stationary line-terminals, a movable carrier and contact brushes carried thereby for traveling over and making contact with said line terminals, stop-setting mechanism, step-by-step mechanism arranged to adjust said stop-setting mechanism for long steps, other step-by-step mechanism arranged to adjust said stop setting mechanism for short steps, electromagnetic means responsive to selective current-impulses, for actuating said step-by-step mechanisms, and means for moving said carrier in a single direct advance over the distance predetermined by the completed selective adjustment of said stop-setting mechanism.

4. A selector switch comprising a movable brush carrier, a magnet adapted to respond to selecting impulses, step-by-step mechanism actuated by said magnet, a stop arranged to be set by said step-by-step mechanism in its advance to determine the travel of said brush-carrier, motor mechanism, a clutch for coupling said motor mechanism to said brush-carrier to move the latter directly to the predetermined point, and means controlled by said stop for throwing off the clutch.

5. A selector comprising a movable switch member, a stop-setter, selectively-operated step-by-step mechanism for adjusting said stop-setter, continuously-acting motor mechanism, a magnetic clutch, means actuated by said clutch for operatively connecting said motor mechanism to the movable switch member to drive the same, and means controlled by said stop-setter according to the particular adjustment thereof, for throwing off the clutch.

6. In a selector, the combination with a vertically-movable slide-rod, contact brushes carried thereby and stationary terminals adapted to be engaged by said brushes, of an elevator mechanism comprising an operating shaft, a sheave turned by said shaft, a flexible member connecting said sheave to said slide-rod, a power shaft, an electromagnetic clutch adapted to couple said power to said operating shaft, and selectively-adjustable stop-mechanism governing said clutch to determine the extent of travel of the slide-rod.

7. In a selector, the combination with a vertical row of contact terminals and a vertically-movable switch member adapted to travel over said terminals, of stop-setting mechanism, electromagnetic step-by-step mechanism, responsive to selecting impulses, for adjusting said step-by-step mechanism, an operating sheave and a flexible member connecting the same to said switch member, a constantly-rotating shaft, a magnetic clutch adapted to couple said shaft to said sheave to elevate the switch member, and means controlled by said stop-setting mechanism according to its selective adjustment, for throwing off the clutch.

In witness, we hereunto subscribe our names this 14 day of January A. D., 1908.

JAMES L. McQUARRIE.
EDWARD B. CRAFT.

Witnesses:
JOHN J. LYNG,
ROBERT E. WILLIAMS.